June 13, 1961  G. WANINGER  2,987,939
ELECTRODE HEAD FOR ELECTRO-EROSIVELY OPERATING
MACHINE TOOLS AND DRIVE THEREFOR Filed July 8, 1958  3 Sheets-Sheet 1

INVENTOR.
GILBERT WANINGER
BY

INVENTOR.
GILBERT WANINGER

United States Patent Office 2,987,939
Patented June 13, 1961

2,987,939
ELECTRODE HEAD FOR ELECTRO-EROSIVELY OPERATING MACHINE TOOLS AND DRIVE THEREFOR
Gilbert Waninger, Bielefeld-West, Germany, assignor to Agie, A.G. für industrielle Elektronik, Losone-Locarno, Switzerland, a company of Switzerland
Filed July 8, 1958, Ser. No. 747,255
6 Claims. (Cl. 74—675)

The present invention relates to an electrode head for electro-erosively operating machine tools adapted to the specific requirements of electro-erosive shaping processes.

The requirements made of machine tools by the electro-erosive processes are distinguished from those of the conventional machining processes inasmuch as the tool, i.e. the electrode, in electro-erosive processes must be capable of being moved relative to the work not only comparatively rapidly but also very slowly. In erosive grinding, by way of example, the relative movement between the tool and the work is comparable to grinding in which material is detached, while in the manufacture e.g. of dies the electrode must be moved into the work at an extremely slow rate and in dependence on an electrical parameter of the process, such as the current intensity.

In addition, the electrode must be mobile in all three dimensions in order to utilize all the possibilities offered by electric erosion. By way of example, the electrode must be capable of performing a vertical movement and a rotary movement either singly or in combination so that both sectional holes and arced holes can be produced. When the two movements are combined at a certain rate, threads or spiral-type shapes will be produced. Accordingly the electro-erosive advance and the rapid movement must be available in all directions of movement.

It is an object of the present invention to comply with the aforesaid conditions by providing an electrode head possessing the possibilities of movement necessary to the electrode, a slow feed for erosive purposes and a rapid feed to move the electrode towards the work and, possibly, to perform erosive grinding with the electrode rotating.

The electrode head according to one aspect of the present invention comprises an electrode holder rotatable about its axis and longitudinally movable in an axial direction, a guiding device meshing with a guiding spindle and so connected with the electrode holder that rotation of the guiding spindle will cause the electrode holder to be axially displaced, a driving shaft connected with the electrode holder, the driving shaft being capable of causing a rotation of the electrode holder independently of its axial position, and further comprising a clutch arranged on the driving shaft of the electrode head and one provided on the feeding shaft connected with the spindle, the ends of the shaft located on the other sides of the clutches being rotatably connected by a change-speed gear, and comprising two independently operable driving systems which may be connected with said shafts, the whole being arranged in such a manner that both the guiding spindle and the electrode driving shaft can be selectively rotated by either driving system and without rotational interconnection via the change-speed gear.

Other features and objects will become apparent from the following description, taken in connection with the drawings in which.

Figure 1:
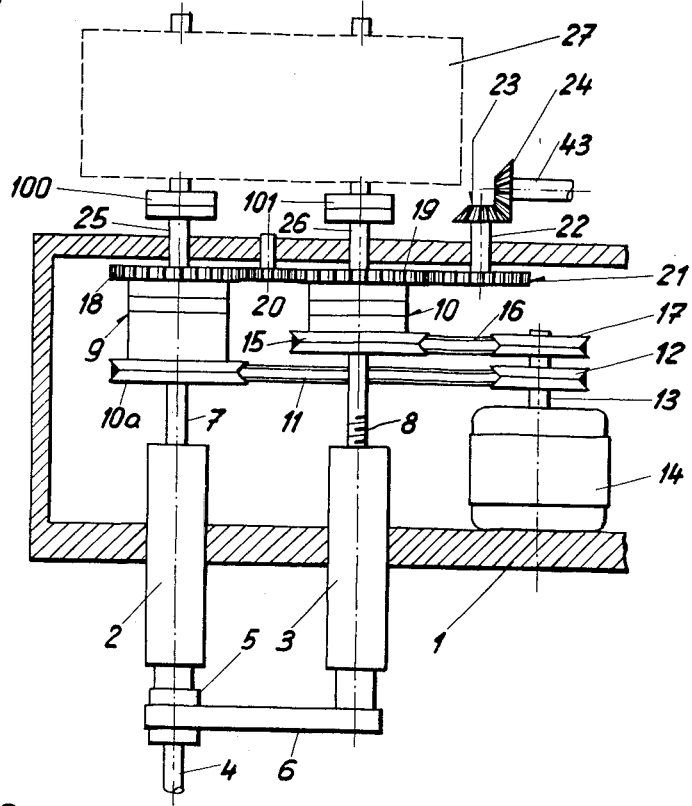
FIG. 1 is a lateral cross sectional view of the electrode head.

FIG. 1 is a diagrammatic section of the essential members of the electrode head. A supporting assembly having the form of a housing in the form of a yoke 1 is arranged so as to be vertically and laterally displaceable on a vertical support of a machine tool (not shown). Arranged in the yoke 1 is a first guiding tube 2 for a member 5, guiding a shaft 4 constituting or carrying the electrode. Also arranged in the yoke 1 is a second guiding tube 3 accommodating the spindle 8 vertically guiding the member 5 and the electrode 4. An arm 6 connected with the member 5 is driven by the spindle 8 to raise or lower the member 5 and, accordingly, the electrode 4.

The driving shaft or spindle 7 and the spindle 8 are each associated with a clutch system 9 and 10 respectively. Both clutch systems are connected with two drives. To the clutch assembly 9 is attached, by way of example, a V-belt pulley 10a rotatably connected, via a V-belt 11 and a V-belt pulley 12, with the shaft 13 of a motor 14 constituting the first driving system. Similarly, to the clutch assembly 10 is attached a V-belt pulley 15 which is rotatably connected, via a V-belt 16, with a V-belt pulley 17 also arranged on the shaft 13 of the motor 14. The motor 14 is provided for a high speed of revolution, e.g. for grinding, by means of electrode 4, or for the rapid displacement of the arm 6, and accordingly, of the electrode guiding member.

Each clutch assembly further comprises a gear 18 and 19 respectively rotatably interconnected by means of a pinion 20. Meshing with the gear 19 is a further pinion 21 which is in turn rotatably connected, via the shaft 22, with a bevel gear 23 which is connected with the second driving system via a suitable bevel gear 24.

The shafts 25 and 26 projecting from the clutch assemblies 9 and 10 establish a rotary connection with a gear arrangement indicated at 27. The gear arrangement 27 is preferably designed as a change-speed gear so that various gear ratios can be set by means of several change gears. Gear assemblies of this type are well known in machine tools so that a detailed description may be dispensed with.

Figure 2:
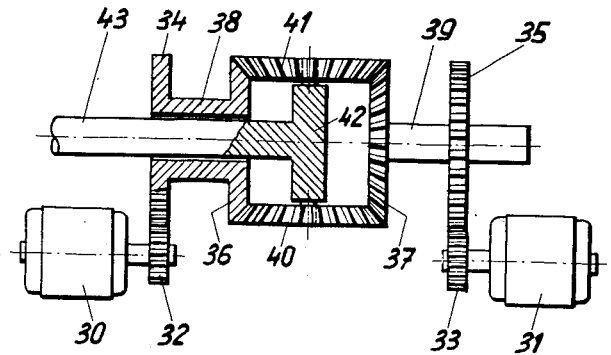
FIG. 2 is a sectional detail view of a driving system.

FIG. 2 shows an embodiment of the second driving system, connected with the bevel gear 24. This drive comprises, by way of example, two motors 30 and 31 which are connected, via pinions 32 and 33, respectively, and gears 34 and 35, respectively, meshing therewith, to a differential gear. This differential gear consists of the bevel gears 36 and 37 connected, via a sleeve 38 and a shaft 39 respectively, with the gears 34 and 35, respectively. A transverse member 42 carrying the compensating gears 40 and 41 is connected with the shaft 43 passing through the sleeve 38, the said shaft carrying the pinion 24 (FIG. 1). Regarding the number of revolutions $n_1$ and $n_2$ of the motor 30 and 31 respectively, the shaft 43 rotates at the rate of $n = \frac{1}{2}(n_1 - n_2)$ when the motors rotate in opposite direction, and at the rate of $$n = \frac{1}{2}(n_1 + n_2)$$

when they rotate in the same direction. If the motor 31 rotates, by way of example, at a constant speed during the erosion process, the number of revolutions of the motor 30 can be controlled at variable speeds, by way of example, in dependence on a parameter of the erosion process such as the current passing through the treated work portion and the electrode. The arrangement disclosed enables the speed of rotation of the shaft 43 and thus selectively the feed rate or the electrode rotation, or both simultaneously—according to the erosive feed conditions—to be controlled by either one or two motors 30 and 31 respectively, and the direction of rotation to be reversed by merely changing the number of revolutions of a motor 30 or 31 or of both motors simultaneously without changing the direction of rotation of the motors.

The drive described may also be replaced by other controlling or copying drives which are known, as the drive described, in conjunction with other units.

Figure 3:
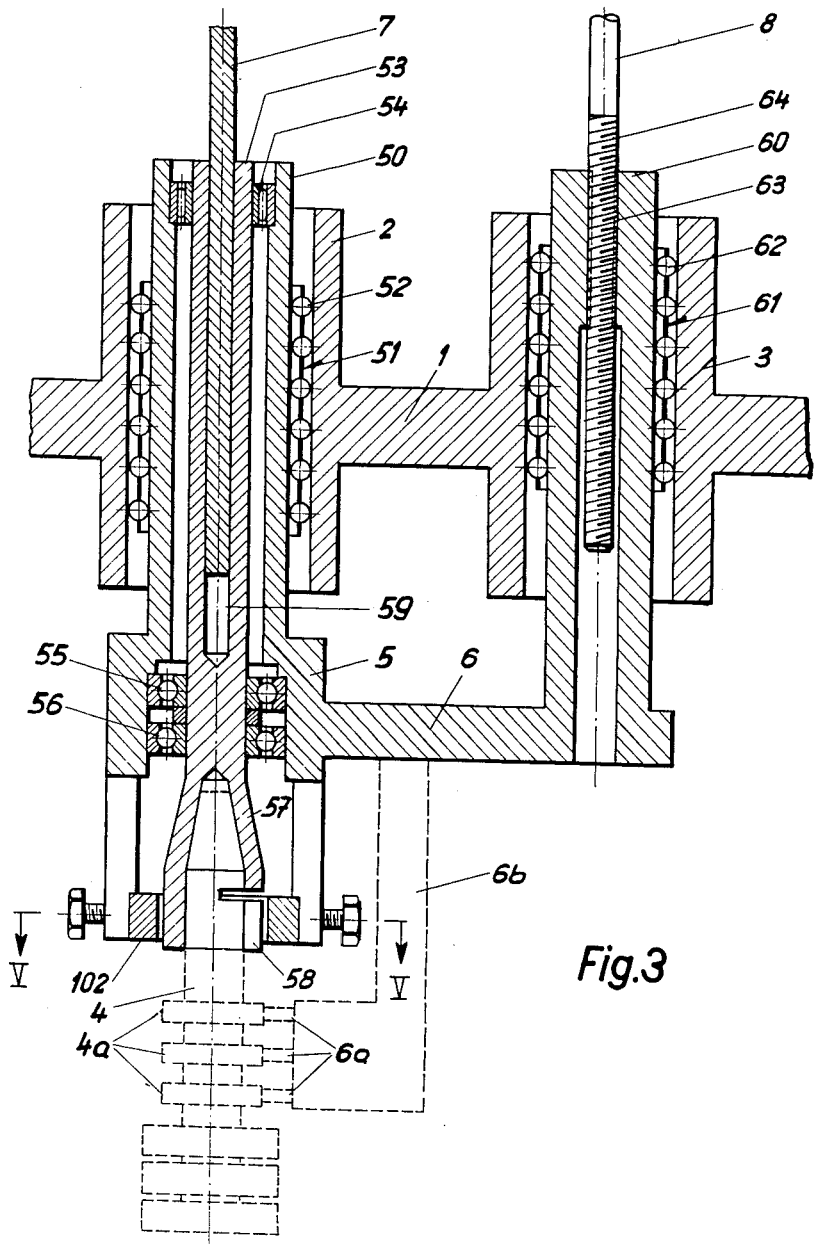
FIG. 3 is a sectional view of the feed and guiding system.

FIG. 3 shows an enlarged cross-section of the guiding tubes 2 and 3 of FIG. 1. Arranged in the guiding tube 2 so as to be longitudinally displaceable is a first inner tube 50. A cage 51 with balls 52 designed to bear against the tube 50 and to hold the latter practically free from play and friction is provided between the first outer tube 2 and the inner tube 50. Similarly, the second tube 3 holds a longitudinally displaceable inner tube 60 which is held practically free from play and friction by means of the balls 62 accommodated in a cage 61. The tube 60 is provided with a guiding thread 63 meshing with a thread 64 of spindle 8. The members 5, 6 and 60 can thereby be adjusted in height by means of spindle 8.

Arranged in the tube 50 is an electrode driving shaft 53 rotatably held as by means of a needle bearing 54 and two ball bearings 55 and 56 absorbing both axial and radial forces. Provided at the lower end of the shaft 53 is the electrode holder 57 with a clamping device diagrammatically indicated at 58 which enables the relative angular position between the electrode 4 and the electrode holder 57 to be accurately adjusted. The electrode driving shaft 53 is provided with a non-circular central bore 59 in which the extension of the shaft 7 is so fitted that both are longitudinally displaceable relative to one another while being rotatably connected. The cross-section of the bore 59 may, by way of example, be square. This arrangement enables the rotary connection between the spindles or shafts 7 and electrode driving shaft 53 to be maintained when the spindle 8 is rotated and the height of connecting member 5 altered.

Arranged in the electrode holder 57 is an electrode 4 indicated in broken lines in FIG. 3. The electrode holder clamping device 58 is designed as e.g. a change holder so that a variety of electrodes can be clamped. The electrode 4 may be provided with grinding rings 4a engaging sliding contacts 6a which are connected with the arm 6 via a carrier 6b.

Figure 4:
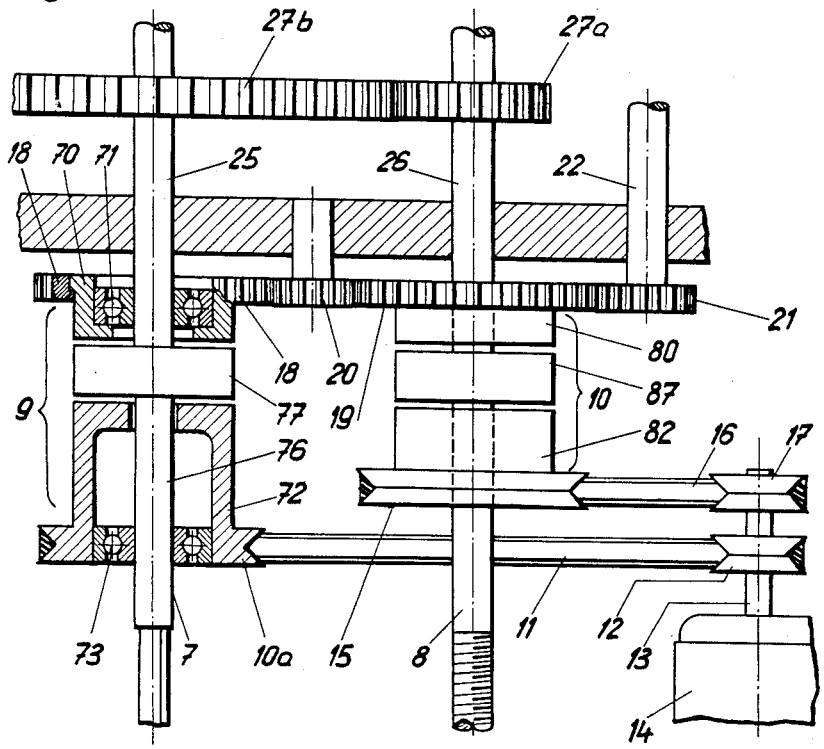
FIG. 4 is a sectional view of the structural unit incorporating the clutches.

FIG. 4 shows the clutch assemblies 9 and 10 in greater detail. The general arrangement is such that the electrode spindle or shaft 7 and the feed spindle 8 can be selectively driven by the first driving system, i.e. by the motor 14 or by the second driving system shown in FIG. 2. It is also possible to couple the two shafts at optional rotation ratios by means of the change-speed gear 27 shown in FIG. 4 as pinions 27a and 27b. This coupling is independent of whether the driving force is connected to the clutch assembly 9 or the clutch assembly 10. Furthermore, a clutch is provided which, in the event of the shafts 25 and 26 being rotatably connected, can break the rigid rotational connection between the shafts 7 and 8 so that the height of the electrode holder can be adjusted without rotating the electrode spindle 7.

In the clutch assembly 9 the gear 18 is, by way of example, arranged on a rotary housing 70 which is supported on the shaft 25 via an antifriction bearing 71. Similarly, the V-belt pulley 10a rests on a rotary housing 72 which accommodates an antifriction bearing 73 by means of which the said housing is supported on shaft 7. The arrangements are such that the housings 70 and 72 respectively are supported on the shafts 25 and 7 respectively so as to be rotatable but locked against axial displacement.

The shaft 7 is directly connected with the clutch member 77 and established a rotary connection with the latter. The clutch member 77 is in turn also connected with the shaft 25. The clutch member 77 is also provided with electro-mechanical devices which can establish a rotary connection with either the housing 72 or the housing 70. These electro-mechanical means may consist of cams or pins projecting from the clutch member 77 and engaging corresponding bores or recesses in the housings 70 or 72. The electric controlling energy required for the actuation of these cams or pins can be supplied to the clutch member 77 by means of collecting rings (not shown).

In a manner entirely analogous the clutch assembly 10 comprises a clutch member 87 which can be selectively engaged with the housing 82, which is in rotary connection with the V-belt pulley 15, or with the housing 80, in rotary connection with the pinion 19. The clutch member 87 is rigidly connected with the shafts 26 and 8.

The most important electro-erosive material removing processes can be performed with the arrangement disclosed. In electro-erosive grinding, by way of example, the members 77 and 72 are interconnected so that the shaft 7 driving the electrode can be caused to rotate by the motor 14. The clutch member 87 is not connected to either of the housings 80 and 82. The change gears are called upon to connect the shafts 7 and 8 in a positive yet freely selected ratio in order to describe spirals or threads of any pitch. The drive, either rapid motion derived from motor 14 or the feed through shaft 22, is always connected to the shaft 7 or 8 which must rotate at a greater speed by virtue of the gear ratio set by the gear 27.

By way of example, if a helical bore is to be produced in a workpiece, a rotary connection may be established between the members 77 and 70 or between the members 87 and 80. In the one case, power is transmitted through shaft 22, the pinions 21, 19, 20 and 18 to the electrode shaft 7 while the feed is transmitted, from shaft 25, to the change gear 27, the shaft 26 and the spindle 8. In the other case, the power for the electrode spindle 7 is transmitted by the clutch members 87 and 80 and the change-speed gear. The arrangement is preferably such as to apply the power direct to the shaft rotating at a greater speed. If the spindle 8 is to be returned after producing the helical bore, all clutch connections are disengaged and the clutch member 87 connected with the housing 82 so that the motor 14 raises the electrode holder at comparatively high speed.

For the purpose of disengaging inserted change gears, clutches 100 and 101 may be provided (FIG. 1). If dies are to be formed by means of a non-rotating electrode, disengagement of the clutch 100 enables the electrode holder to remain idle without necessitating the removal of the change gears in the change-speed gear 27.

Figure 5:
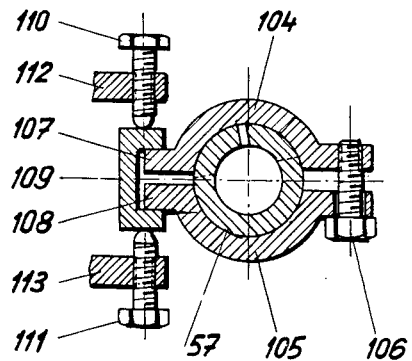
FIG. 5 is a sectional view taken along line V—V in FIG. 3 of the locking device diagrammatically disclosed in FIG. 3.

In the latter case, it is advantageous to provide a locking device for the electrode shaft. An example of such a device is shown in greater detail in FIG. 5.

The locking device 102 comprises two half rings 104 and 105 enclosing the electrode holder 57, which can be tightened for locking the holder by means of a screw 106, the opposite ring ends 107 and 108 resting in the stirrup 109. The stirrup 109 is subject to the action of two screws 110 and 111 of which the nuts 112 and 112 are rigidly connected with the driving arm 6. Actuation of the screws 110 and 111 enables fine adjustment of the electrode shaft 52 and of the electrode to be performed via the tightened half rings 104 and 105. The locking device 102 according to FIG. 5 therefore enables the shaft 53 to be both locked and adjusted in its angular position in order very accurately to place die or section electrodes in a predetermined position. The angular range of the fine adjustment is large enough to enable the electrode to be manually set with ease.

Having now particularly described and ascertained the nature of my said invention and in what manner the same is to be performed, I declare what I claim is:

1. In a machine for electroerosive treatment of workpieces; a drive mechanism comprising a housing, a pair of spindles rotatably mounted in said housing, each of said spindles being rotatable about its longitudinal axis, means communicating said pair of spindles with one another so that rotational movement of one of said spindles is adapted to cause axial displacement of a tool member relative to the other of said spindles, first drive means operatively connected to each of said spindles, second drive means operatively connected to each of said spindles, clutch means cooperable with said first and second drive means for selectively coupling any of said spindles to either said first or second drive means, and change gear means for rotatably connecting said pair of spindles to one another in a desired rotational speed ratio.

2. In a machine for electroerosive treatment of workpieces according to claim 1, including further clutch means cooperable with said change gear means for disengaging any of said spindles from said change gear means.

3. In a machine for electroerosive treatment of workpieces according to claim 1, said communicating means including a pair of axially displaceable tubular members disposed circumjacent each of said spindles and a connecting arm interconnecting said axially displaceable tubular members.

4. In a machine for electroerosive treatment of workpieces according to claim 3, said communicating means further including a driving shaft rotatably connected to said other of said spindles adapted to support a tool member.

5. In a machine for electroerosive treatment of workpieces: a drive mechanism comprising a housing, a pair of spindles rotatably mounted in said housing, each of said spindles being rotatable about its longitudinal axis, means communicating said pair of spindles with one another so that rotational movement of one of said spindles causes axial displacement of a tool member relative to the other of said spindles, first drive means operatively connected to each of said spindles, second drive means operatively connected to each of said spindles, said second drive means including a pair of drive members, at least one of said drive members being controllable with respect to speed and direction of rotation so that the rotational movement of said spindles may be adjusted, clutch means cooperable with said first and second drive means for selectively coupling any of said spindles to either said first or second drive means independently of one another, and change gear means for rotatably connecting said pair of spindles to one another in a desired rotational speed ratio.

6. A drive mechanism comprising a housing, a pair of guide tubes supported by said housing, bearing cages in said guide tubes, a separate axially displaceable tubular member interconnected by a connecting arm supported internally of each of said guide tubes, a pair of spindles cooperating with each of said displaceable tubular members with each of said tubular members being axially displaceable relative to its associated spindle, each of said spindles being rotatable about its longitudinal axis so that rotational movement of one of said spindles causes axial displacement of each of said separate tubular members, first drive means operatively connected to each of said spindles, second drive means operatively connected to each of said spindles, clutch means cooperable with said first and second drive means for selectively coupling any of said spindles to either said first or second drive means independently of one another, and change gear means for rotatably connecting said pair of spindles to one another in a desired rotational speed ratio.

References Cited in the file of this patent

UNITED STATES PATENTS

| | | |
|---|---|---|
| 628,190 | Stone | July 4, 1899 |
| 1,302,222 | Rivett | Apr. 29, 1919 |
| 2,385,665 | Warwick | Sept. 25, 1945 |
| 2,413,203 | Weingart | Dec. 24, 1946 |
| 2,403,092 | Lear | July 2, 1946 |
| 2,628,324 | Batsel | Feb. 10, 1953 |
| 2,773,968 | Martelloti et al. | Dec. 11, 1956 |
| 2,792,723 | Zelewsky | May 21, 1957 |
| 2,916,949 | Smith et al. | Dec. 15, 1959 |

FOREIGN PATENTS

| | | |
|---|---|---|
| 412,892 | Great Britain | July 5, 1934 |